United States Patent
Lambertin et al.

(10) Patent No.: US 8,968,463 B2
(45) Date of Patent: Mar. 3, 2015

(54) HYDROGEN-TRAPPING MATERIAL, METHOD OF PREPARATION AND USES

(75) Inventors: David Lambertin, Orange (FR); Celine Cau Dit Coumes, Tavel (FR); Fabien Frizon, Villeneuve-les-Avignon (FR); Christophe Joussot-Dubien, Rochefort du Gard (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 661 days.

(21) Appl. No.: 13/139,272

(22) PCT Filed: Dec. 9, 2009

(86) PCT No.: PCT/EP2009/066769
§ 371 (c)(1),
(2), (4) Date: Oct. 21, 2011

(87) PCT Pub. No.: WO2010/066811
PCT Pub. Date: Jun. 17, 2010

(65) Prior Publication Data
US 2012/0024197 A1    Feb. 2, 2012

(30) Foreign Application Priority Data

Dec. 11, 2008 (FR) ...................... 08 58488

(51) Int. Cl.
| | |
|---|---|
| B01J 20/02 | (2006.01) |
| C01B 3/00 | (2006.01) |
| B01J 20/28 | (2006.01) |
| B01J 20/06 | (2006.01) |
| C01B 3/50 | (2006.01) |

(52) U.S. Cl.
CPC .............. *B01J 20/06* (2013.01); *B01J 20/0222* (2013.01); *C01B 3/0078* (2013.01); *B01J 20/28026* (2013.01); *B01J 2220/42* (2013.01); *B01J 20/0233* (2013.01); *C01B 3/508* (2013.01); *Y02E 60/327* (2013.01); *C01B 3/001* (2013.01)
USPC ........... 106/692; 106/713; 106/733; 106/769; 427/427

(58) Field of Classification Search
USPC ................... 106/692, 713, 733, 769; 427/427
See application file for complete search history.

(56) References Cited

U.S. PATENT DOCUMENTS

| | | |
|---|---|---|
| 3,939,006 A | 2/1976 | Kozawa |
| 4,252,666 A | 2/1981 | Kozawa et al. |
| 5,837,158 A | 11/1998 | Shepodd et al. |

(Continued)

FOREIGN PATENT DOCUMENTS

| | | |
|---|---|---|
| DE | 3730743 | 3/1989 |
| DE | 3840794 | 6/1990 |
| EP | 0054604 | 6/1982 |
| EP | 0900771 | 3/1999 |

(Continued)

OTHER PUBLICATIONS

P. J. Nigrey, "An Issue Paper on the Use of Hydrogen Getters in Transportation Packaging", Sandia National Laboratories Report SAND2000-0483, Feb. 2000.

(Continued)

*Primary Examiner* — Paul Marcantoni
(74) *Attorney, Agent, or Firm* — Knobbe Martens Olson & Bear LLP

(57) ABSTRACT

A material capable for trapping a flammable gas such as hydrogen comprising at least one metal oxide in a cementitious matrix is disclosed. According to some aspects, the preparation of such a material and its different uses are also disclosed.

20 Claims, 1 Drawing Sheet

(56) References Cited

U.S. PATENT DOCUMENTS

| | | | |
|---|---|---|---|
| 5,888,925 | A | 3/1999 | Smith et al. |
| 6,063,307 | A | 5/2000 | Shepodd et al. |
| 6,200,494 | B1 | 3/2001 | Manini et al. |
| 7,001,535 | B2 | 2/2006 | Shepodd |
| 2003/0213934 | A1 | 11/2003 | Shepodd |
| 2008/0061007 | A1 | 3/2008 | Abadie et al. |

FOREIGN PATENT DOCUMENTS

| | | |
|---|---|---|
| EP | 1 394 813 | 3/2004 |
| FR | 2527376 | 11/1983 |
| FR | 2874120 | 2/2006 |
| GB | 2124015 | 2/1984 |
| WO | WO 2006/064289 | 6/2006 |

OTHER PUBLICATIONS

Livingston et al., "Enhanced Polymer Hydrogen Getters for Use in the TRUPACT-II Hydrogen Gas Getters Evaluation Program Phase 2 Final Report", Sandia National Laboratories Report SAND2002-8267, Jun. 2002.

Stone et al., "Improved Hydrogen Gas Getters for TRU Waste Mixed Waste Focus Area-Phase 1", Idaho National Engineering and Environmental Laboratories Report, INEEL-EXT 2011-00085, Feb. 2001.

Latroche et al., "Hydrogen Storage Properties of Metallic Hydrides", Ann. Chim. Sci. Mat., 2005, 30 (5), pp. 471-482.

Charcosset et al., "Catalytic effects in the reduction of metal oxides. Mobility of activated hydrogen on the surface of te solids: spill-over and jump-over phenomena", Ind. Chim. Belg., 38, 1973, pp. 481-495.

Maruéjouls et al., "Mitigation of the hydrogen risk in fusion facilities: the first experimental results", Fusion Engineering and Design, 69, 2003, pp. 585-591.

Valéry Chaudron, Etude De La Mitigation Du Risque Hydrogene Dans Un Reacteur De Fusion, Institut National Polytechnique de Lorraine, Apr. 1998.

French Preliminary Search Report for French Patent Application No. 716419 dated Jul. 3, 2009.

International Search Report for International Patent Application No. PCT/EP2009/066769 dated Apr. 7, 2010 by European Patent Office.

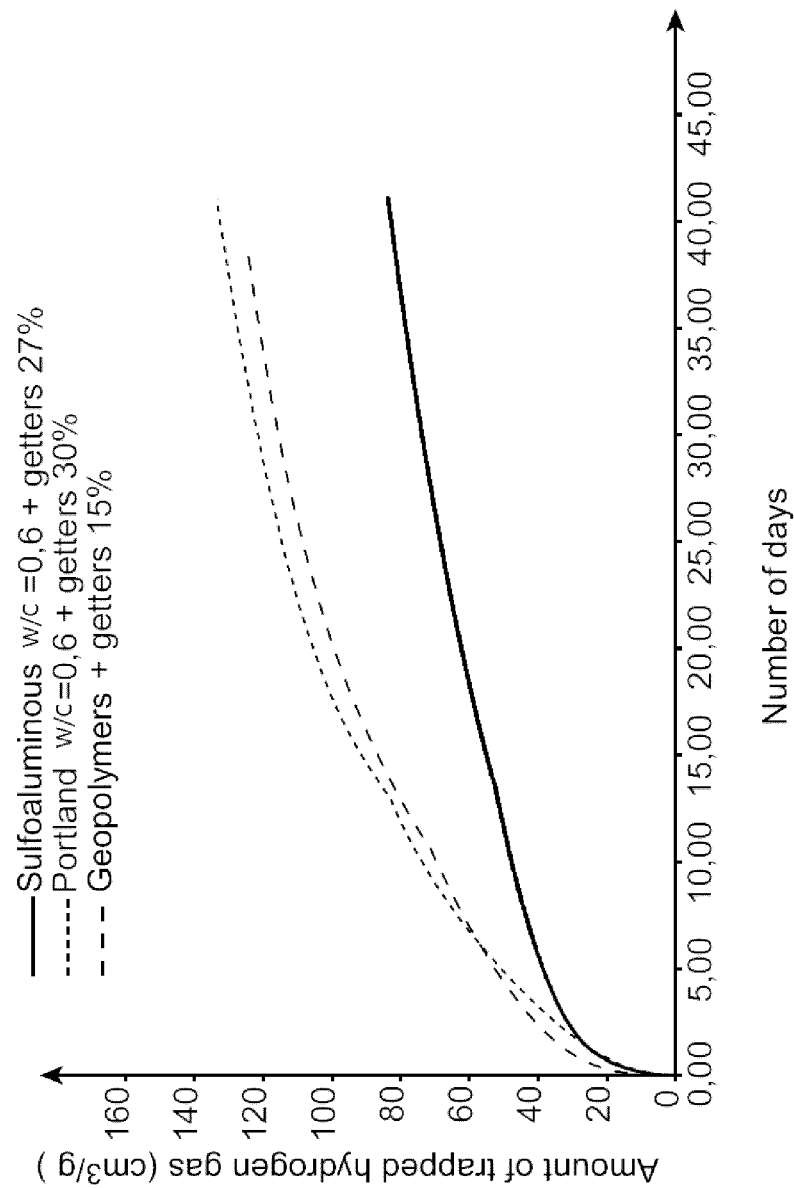

HYDROGEN-TRAPPING MATERIAL, METHOD OF PREPARATION AND USES

TECHNICAL FIELD

The present invention belongs to the technical field for removing flammable gases such as hydrogen.

More particularly, the present invention proposes a material comprising at least one coated hydrogen getter in a mineral matrix and this, for handling the hydrogen risk notably within the scope of the transport safety of radioactive waste and of the reversibility phase of the storage.

The present invention also relates to a method for preparing such a material, its uses and a method for removing flammable gases.

BACKGROUND

Nuclear installations generate a certain amount of « technological waste» which may comprise objects and materials of very diverse natures such as motor parts, filters, metal waste, rubble, glasses, etc. . . . . In this waste are also found organic materials based on cellulose such as paper, wood, cotton, or in the form of plastic materials such as packaging covers in vinyl or in polyurethane, boots, gloves, and diverse objects in polymer materials. All this waste may also contain small amounts of liquids such as water and organic liquids (oils, hydrocarbons, etc. . . . ). All these waste materials are radioactive materials either activated during their stay in nuclear installations, or contaminated by radioactive uranium or plutonium powder during their use in these installations. Technological waste is periodically evacuated to processing and storage centers. For this, they are conditioned in containers such as barrels, garbage bins or cases which are then placed in containers.

The transport and storage of technological waste poses a specific problem related to the nature of the transported materials. Indeed, as described earlier, this waste often contains solid organic materials or in the form of residual liquids, or further a certain amount of water, contaminated by uranium or plutonium which imparts a radioactive nature to these materials. Now, uranium and plutonium are emitters of α particles which notably have the property of dissociating organic molecules so as to release gaseous compounds such as carbon monoxide, carbon dioxide, oxygen and nitrogen, as well as flammable gases. This phenomenon, called « radiolysis», is expressed by the dissociation of the molecules of carbonaceous and hydrogenated organic compounds such as those which are contained in plastic materials and hydrocarbons or by dissociation of water molecules with production of hydrogen.

The production of flammable gases and notably of hydrogen by radiolysis mainly poses problems when the technological waste is confined in a closed enclosure with a relatively limited volume. Indeed, the radiolysis gases are then released in a confined volume, so that a high concentration of flammable gases may be reached rapidly.

During the transport of this technological waste and in order to optimize the transport capacity, a significant number of waste receptacles are placed in a same container, which reduces the free space available in the container for flammable gases which escape from the waste and receptacles. Further, the receptacles for conditioning the waste, closed by lids optionally crimped by joints, have a certain seal. In this case, the flammable gases preferentially accumulate in the confined space formed by the residual free space existing inside each of the receptacles.

Generally, the flammable gases produced by radiolysis form an explosive mixture when they are put into the presence of other gases such as air, when their concentration exceeds a limiting value, a so-called « flammability threshold» . In the case of hydrogen, the flammability threshold in air is located around 4%. Thus, when the hydrogen concentration in air exceeds this threshold, a source of heat or a spark may be sufficient for igniting the mixture or for producing a violent deflagration in a confined enclosure.

Various studies and observations have shown that the concentration of flammable gases such a hydrogen, produced by radiolysis in a closed enclosure containing radioactive materials including hydrogenated components, may sometimes reach values of about 4% within a few days. This situation notably corresponds to the case when technological waste materials emit intense α particles and contain many organic molecules.

Now, it is common that a container remains closed for much longer durations before being opened. In this case, a spark caused by impacts or friction produced during transport in the enclosure of the container or in a receptacle filled with waste, may cause inflammation or explosions. Such an inflammation or explosion might extend to the whole of the load of the container, which is expressed by a serious risk of accident on public highways. A comparable risk exists if the container is stuck in an accidental fire situation during its transport. Further, the risk of an accident subsists during final operations for opening the container and unloading the receptacles, and during their possible opening. Indeed, these operations require many handling operations, which are then potentially dangerous.

It is particularly important to take into account the risk of accumulation of inflammable gases like hydrogen in any closed enclosure intended to contain radioactive materials. Steps must therefore be taken in order to allow removal of flammable gases such as hydrogen produced by radiolysis and to thereby avoid the risk of a hydrogen explosion.

Many compounds capable of trapping hydrogen during the transport of radioactive waste have been proposed (organic compounds, metal hydrides and oxides . . . ) [1]. The selection of the use of these hydrogen scavengers, commonly called « getters» in the literature, depends on the reversibility of the reaction of hydrogen and of the material. The difficulty also lies in handling gaseous poisons which may prevent the reaction of hydrogen with the getter.

A technique for removing flammable gases such as hydrogen found inside a closed enclosure such as a container for transporting radioactive waste, is essentially based on introducing into the enclosure a getter catalyzing the recombination of oxygen and hydrogen into water (or a hydrogen catalytic recombiner), in the contact of which hydrogen combines with the oxygen present in the air of the cavity in order to form water according to the catalytic oxidation mechanism of hydrogen. Patent application FR 2 874 120 [2] describes the use, in a closed enclosure, a) of a catalyst of an oxidation reaction of hydrogen by the oxygen of the enclosure, supported by a solid inert support and b) of a catalyst of the oxidation reaction of CO into $CO_2$. The first catalyst advantageously appears in the form of alumina impregnated with palladium and the second catalyst in the form of a mixture comprising CuO and $MnO_2$.

Many combinations of organic getters have been patented with different catalysts such as platinum and palladium, and with different supports such as graphite, aluminium oxide and barium carbonate. Thus, U.S. Pat. No. 5,837,158 and U.S. Pat. No. 6,063,307 describe a composition for removing hydrogen from a closed space comprising an organic polymer, a hydrogenation catalyst and an inert diluent [3, 4]. U.S. Pat. No. 7,001,535 proposes a composition for removing the hydrogen and water produced by catalytic oxidation of hydrogen, said composition comprising an organic polymer, a hydrogenation catalyst and a polyacrylate absorbing liquid water [5]. These different compositions are marketed by Vacuum Energy, Inc. (USA) [6]. The handling of poisons such as carbon monoxide, carbon tetrachloride, etc. . . . is carried out by adding reactive compounds (zeolite, HOP-CALITE®) [7] or by coating the organic getter in PVC or polystyrene [8]. The limit of use of this technology is the presence of organic compounds and their sensitivities to irradiation.

As for metal hydrides, many compounds have been studied for storing hydrogen within the scope of novel energy technologies [9]. Many documents on the use of alloys based on zirconium, vanadium, iron, aluminium and nickel are available. The shaping of these materials is based on standard metallurgical techniques.

Metal oxides may also be used for trapping hydrogen [10]. International application WO 2006/064289 describes the use of two metal oxides and notably of a palladium oxide and a transition metal oxide [11]. In this international application, the hydrogen getter notably appears as pellets, the mixture of metal oxides may further comprise a material absorbing humidity such as zeolite and a binder such as silica fume. U.S. Pat. No. 6,200,494 proposes mixtures of metal palladium and a transition metal oxide [12]. U.S. Pat. No. 5,888,925 describes a hydrogen getter comprising an oxide of a metal from the group of platinum and a siccative molecular sieve of the zeolite type mixed with a silicone-based elastomer in order to form a matrix [13], this binder having the deficiency of being sensitive to radiolysis.

Among the preferred metal oxides which may be used, manganese oxide catalyzed by silver oxide reacts from room temperature with hydrogen. According to A. Kozawa, the mixture of $MnO_2$ (90% by mass) and of $Ag_2O$ (10% by mass) appears as the optimum mixture for a maximum capacity for trapping hydrogen [14]. Shaping of this reactive mixture was proposed by powder compaction in order to obtain pellets with a height of 1 cm [15]. However, no particular hydrogen getter containing such an oxide mixture, not sensitive to radiolysis and able to handle poison gases has been proposed.

U.S. Pat. No. 3,939,006 belongs to the field of electrochemical cells and notably sealed galvanic cells. This patent describes a material absorbing hydrogen comprising three essential components which are (1) a substance which reacts with hydrogen, of the metal oxide type, (2) a catalyst for the oxidation reaction of hydrogen and (3) a binder for maintaining the components (1) and (2) as an entire unit. The preferred binder is Portland cement having a W/C ratio of 0.0875 (cf. Example 1 where 7 ml of water are used for 80 g of cement) [18].

Therefore, there exists a need for a device with which flammable gases and notably hydrogen may be removed over a long duration, in a closed enclosure or not, containing radioactive materials, this device should be easy to handle and to prepare and be insensitive to radiolysis. DESCRIPTION OF CERTAIN INVENTIVE ASPECTS With the present invention, it is possible to find at least partly a remedy to the drawbacks and technical problems listed above. Indeed, the latter proposes a method and a device for removing flammable gases like hydrogen in which a hydrogen trapping compound (a so-called « getter» ) is dispersed, coated and/or incorporated into a cementitious matrix, i.e. a matrix based on hydraulic binder or amorphous alumino-silicate polymers allowing diffusion of hydrogen and which may thereby react with the getter.

Indeed, the coating of a hydrogen getter in a matrix in no way modifies its reactivity towards flammable gases like hydrogen. Radiolytic degradation of material according to the invention is limited by the selection of a mineral matrix.

Further, this cementitious matrix forms a reservoir of species which may neutralize the acids simultaneously present with the flammable gases like hydrogen in the radiolysis gases and thus prevent them from poisoning the hydrogen getter. Thus, the cementitious matrix applied in the present invention provides the advantage of trapping acid poison gases such as HCl and this by a chemical reaction. With the formulation of the inorganic matrix, it is possible to control the porosity of the cement/hydrogen getter mixture and to thereby limit the action of potential poisons on the hydrogen getter.

Finally, the material object of the invention is a material which is easy to prepare, easy to handle and ready-to-use.

More particularly, the present invention proposes a material capable of trapping flammable gas comprising at least one metal oxide in a cementitious matrix.

The material object of the present invention is advantageously capable of trapping hydrogen. Within the scope of the present invention, by hydrogen is meant hydrogen gas $H_2$ and isotopic forms of the latter. By « isotopic forms of hydrogen», are meant the deuterated forms comprising at least one deuterium of formula $_1^2H$ and represented by D, such as HD and $D_2$; the tritiated forms comprising at least one tritium of formula $_1^3H$ and represented by T, such as HT and $T_2$ and mixed forms (i.e. both deuterated and tritiated forms) such as DT.

Any metal oxide capable of trapping hydrogen by irreversible reduction of said metal oxide may be used within the scope of the material object of the present invention. Indeed, such a hydrogen getter may be partly regenerated by heating but without any hydrogen evolution; said trapping is therefore irreversible. In the material object of the invention, said metal oxide is found coated, dispersed and/or incorporated into the cementitious matrix of said material. Advantageously, the metal oxide applied within the scope of the present invention is an oxide of a metal belonging to the group of platinum, an oxide of an earth alkaline metal, an oxide of a transition metal or a mixture thereof. In particular, the metal oxide applied within the scope of the present invention is selected from the group consisting of platinum oxide, palladium oxide, rhodium oxide, ruthenium oxide, beryllium oxide, magnesium oxide, calcium oxide, strontium oxide, barium oxide, radium oxide, manganese oxide, manganese oxide catalyzed by silver, copper oxide, iron oxide, nickel oxide, cobalt oxide, cerium oxide, silver oxide, zirconium oxide and mixtures thereof. By « mixtures» , is meant here a mixture of at least two, at least three or at least four different oxides of the list above.

In a particular application of the present invention, the metal oxide used is manganese oxide ($MnO_2$) catalyzed by silver. As defined in U.S. Pat. No. 4,252,666 [14], a manganese oxide catalyzed by silver is a mixture of a manganese oxide with metal silver, a compound based on silver or a mixture thereof. In the thereby obtained advantageously homogeneous mixture, silver is present in a catalytic amount, i.e. an amount sufficient for catalyzing the reaction between the manganese oxide and the flammable gas such as hydrogen. A silver-based compound may notably be selected from the group formed by a silver oxide, a silver acetate, a silver carbonate, a silver chromate, a silver dichromate, a silver nitrate, a silver nitride, a silver permanganate, a silver metaphosphate, a silver pyrophosphate, a silver sulfate, a silver perchlorate, a silver chloride and mixtures thereof.

In a most particular application of the present invention, the metal oxide used is a mixture of manganese oxide ($MnO_2$) and of silver oxide ($Ag_2O$). In the $MnO_2/Ag_2O$ mixture applied within the scope of the present invention, the amount of silver is advantageously comprised between 0.5 and 30% and notably between 1 and 10% by weight based on the total weight of said mixture.

By «cementitious matrix», is meant within the scope of the present invention, a material which is solid and porous in the dry condition, obtained following hardening of a plastic mixture containing finely milled materials and water or a saline solution, said plastic mixture being capable of setting and of hardening over time. This mixture may also be designated under the terms of «cementitious mixture» or «cementitious composition». Any natural or synthetic cementitious matrix, known to one skilled in the art may be used within the scope of the present invention.

In a first embodiment of the invention, the cementitious matrix applied within the scope of the present invention is a hydraulic cementitious matrix in which hardening is the result of hydration of the finely milled materials of the cementitious mixture. The finely milled materials of the cementitious mixture in totality or in part consist of a finely milled clinker. By «clinker», is meant a mixture comprising one or more elements selected from the group formed by:
  limestone,
  limestone having a CaO content varying between 50 and 60%,
  a source of alumina such as ordinary bauxite or red bauxite, clay, and
  a source of sulfate such as gypsum, calcium sulfate hemihydrate, plaster, natural anhydrite or sulfocalcic ashes,
  said element(s) being crushed, homogenized and brought to a temperature of more than 1,200° C., notably more than 1,300° C., in particular of the order of 1,450° C. By «of the order of 1,450° C.», is meant a temperature of 1,450° C.±100° C., advantageously a temperature of 1,450° C.±50° C. The calcination step at high temperature is called «clinkerization». After preparing the clinker and before or during its milling, at least one other additive such as a sulfate source as defined earlier, may be added to it.

Advantageously, the hydraulic cementitious matrix applied within the scope of the present invention has a W/C ratio comprised between 0.3 and 1.5 and notably between 0.4 and 1. By «W/C ratio», is meant the mass ratio of the amount of water (or of saline solution) over the amount of cement (i.e. a dry cementitious mixture which corresponds to the cementitious mixture without any water or saline solution). These amounts are the ones applied at the moment of the formulation of the cementitious matrix. A W/C ratio comprised between 0.3 and 1.5 and notably between 0.4 and 1 gives the possibility of guaranteeing an optimum amount and an optimum size of the pores in the hydraulic cementitious matrix for diffusion of the gases and, consequently, optimum for trapping flammable gases in the material according to the invention.

In this first embodiment of the invention, the cementitious matrix may be a Portland cement or a blended Portland cement. A Portland cement advantageously comprises between 50 and 70% of tricalcium silicate [$(CaO)_3SiO_2$], between 10 and 25% of dicalcium silicate [$(CaO)_2SiO_2$], between 5 and 15% of tricalcium aluminate [$(CaO)_3Al_2O_3$], between 5 and 10% of tetracalcium aluminoferrite [$(CaO)_4Al_2O_3Fe_2O_3$]. Such a Portland cement may be mixed with secondary compounds in order to obtain a «blended Portland cement» wherein the amounts of secondary compounds such as limestone or blast furnace slags is greater than 3%, notably comprised between 5 and 80%, in particular, comprised between 10 and 60% by weight based on the total weight of said blended Portland cement. Advantageously, the applied Portland cement or blended Portman cement has a W/C ratio comprised between 0.3 and 1.5 and notably between 0.4 and 1.

In this first embodiment of the invention, the cementitious matrix may also be an aluminous cementitious matrix, i.e. the clinker of which comprises in majority calcium aluminates. Advantageously, the applied aluminous cementitious matrix has a ratio W/C comprised between 0.3 and 1.5 and notably between 0.4 and 1.

Further, in this first embodiment of the invention, the cementitious matrix may also be a sulfo-aluminous and/or ferro-aluminous cementitious matrix. Patent application EP 0 900 771 notably describes cementitious mixtures based on sulfo-aluminous and ferro-aluminous clinkers [16]. These clinkers are cementitious binders with properties of rapid hardening and obtained by clinkerization at a temperature varying between 1,200 and 1,350° C. of mixtures containing at least one source of lime such as limestones having a CaO content varying between 50 and 60%, at least one alumina source and at least one source of sulfate as defined earlier. Advantageously, a sulfo-aluminous clinker comprises between 28 and 40% of $Al_2O_3$, between 3 and 10% of $SiO_2$, between 36 and 43% of CaO, between 1 and 3% of $Fe_2O_3$, and between 8 and 15% of $SO_3$. A ferro-aluminous clinker as for it comprises between 25 and 30% of $Al_2O_3$, between 6 and 12% of $SiO_2$, between 36 and 43% of CaO, between 5 and 12% of $Fe_2O_3$, and between 5 and 10% of $SO_3$. Advantageously, the applied sulfo-aluminous and/or ferro-aluminous cementitous matrix has a ratio W/C comprised between 0.3 and 1.5 and notably between 0.4 and 1.

In a second embodiment of the invention, the cementitious matrix applied within the scope of the present invention is a geopolymeric cementitious matrix in which hardening is the result of the dissolution/polycondensation of finely milled materials of the cementitious mixture in a saline solution such a a saline solution with a high pH.

In this second embodiment, the geopolymeric cementitious matrix is therefore a geopolymer. By «geopolymer», is meant within the scope of the present invention an amorphous inorganic alumino-silicate polymer. Said polymer is obtained from a reactive material essentially containing silica and aluminium, activated by a highly alkaline solution, the solid/solution mass ratio in the formulation being low. The structure of a geopolymer consists of a Si—O—Al lattice formed with tetrahedra of silicates ($SiO_4$) and of aluminates ($AlO_4$) bound at their apices by sharing oxygen atoms. Inside this lattice, are found charge-compensating cation(s) also called compensation cation(s) with which it is possible to compensate for the negative charge of the complex $AlO_4^-$. Said compensation cation(s) is (are) advantageously selected from the group consisting of alkaline metals such as lithium (Li), sodium (Na), potassium (K), rubidium (Rb) and cesium (Cs), earth alkaline metals such as magnesium (Mg), calcium (Ca), strontium (Sr) and barium (Ba) and mixtures thereof. The reactive material essentially containing silica and aluminium which may used for preparing the geopolymeric cementitious matrix applied within the scope of the invention, is advantageously a solid source containing amorphous alumino-silicates. These amorphous alumino-silicates are notably selected from minerals of natural alumino-silicates such as illite, stilbite, kaolinite, pyrophyllite, andalusite, bentonite, kyanite, milanite, grovenite, amesite, cordierite, feldspath, allophane, etc.; minerals of calcinated natural alumino-silicates such as metakaolin; synthetic glasses based on pure alumino-silicates; aluminous cement; pumice; calcinated byproducts or residues from industrial exploitation such as flying ashes and blast furnace slags respectively obtained from combustion of coal and during transformation of iron ore (or iron-stone) into cast iron in a blast furnace; and mixtures thereof.

The saline solution with a high pH also known in the field of geopolymerization as an « activation solution» is a highly alkaline solution which may possibly contain silicate components notably selected from the group consisting of silica, colloidal silica and glassy silica. By « highly alkaline» or « of high pH» , is meant a solution for which the pH is greater than 9, notably greater than 10, in particular greater than 11 and, more particularly greater than 12.

The saline solution of high pH comprises the compensation cation or the mixture of compensation cations in the form of an ionic solution or a salt. Thus, the saline solution of high pH is notably selected from an aqueous solution of sodium silicate ($Na_2SiO_3$), of potassium silicate ($K_2SiO_2$), of sodium hydroxide (NaOH), of potassium hydroxide (KOH), of calcium hydroxide ($Ca(OH)_2$), of cesium hydroxide (CsOH) and their sulfate, phosphate and nitrate derivatives, etc. . . . .

In the main object of the present invention, the metal oxide is incorporated into the cementitious matrix up to an incorporation level of 80% by mass based on the total mass of said material. Advantageously, this incorporation level is comprised between 5 and 70% and, in particular, between 10 and 50% by mass based on the total mass of said material.

The material object of the present invention may appear in various forms, of small or large size, depending on the sought application. Thus, the material object of the present invention may be in the form of fine powder, coarse powder, grains, granules, pellets, beads, balls, blocks, rods, cylinders, plates, or mixtures thereof. These various forms may notably obtained by plasticity before hardening of the cementitious matrix of the material object of the present invention.

The present invention also relates to a closed enclosure capable of containing radioactive materials capable of producing by radiolysis or by a chemical reaction, at least one flammable gas. The enclosure of the invention which may be hermetically sealed further contains at least one material as defined earlier.

The radioactive materials which may be contained in the enclosure object of the invention may be technological waste materials as described earlier, stemming from a workshop for manufacturing or processing fuel elements intended for a nuclear reactor or stemming from such a reactor. Advantageously, the closed enclosure, object of the present invention, may appear as a receptacle, a barrel, a pre-concreted barrel, a container or a pre-concreted container.

Indeed, in a particular application relating to the transport of radioactive materials, the radioactive materials are generally conditioned in closed enclosures such as receptacles (or barrels) secured inside a container. The material according to the present invention is then advantageously positioned inside these receptacles. This allows removal of hydrogen directly where it is produced. Only a very small fraction of the hydrogen will then escape from the receptacles and will diffuse into the free space of the container, in which it may be removed by a material according to the present invention, also positioned in a small amount in this free space.

If the receptacles are sealed, it may be decided to place the material according to the present invention in a sufficient amount only inside these receptacles. Indeed, the hydrogen concentration in the atmosphere of the container will then always be insignificant since hydrogen is removed in the receptacles and only diffuses very little in the enclosure of the container.

It should be noted that by introducing the material according to the present invention into the receptacles it is possible to continue to prevent accumulation of hydrogen after their final unloading. Further, the receptacles are intended to be stored on site for a long period, the material according to the present invention may possibly be renewed in order to ensure hydrogen removal continuously on the storage site. In other words, the use of the material according to the present invention is not limited to the removal of flammable gases produced in a closed enclosure during transport.

The present invention also relates to a method for preparing a composite material as defined earlier. Said preparation method comprises a step consisting of incorporating a hydrogen getter containing at least one metal oxide in a cementitious mixture.

In particular, the preparation method according to the invention comprises the steps of:

a) possibly preparing a hydrogen getter containing at least one metal oxide and, advantageously, a metal oxide as defined earlier;

b) incorporating the hydrogen getter optionally prepared in step (a) into a cementitious mixture.

Step (a) of the method according to the invention is optional. Indeed, the hydrogen getter containing at least one metal oxide which may be used in this method, may be a commercially accessible hydrogen getter which does not require any particular preparation before the coating with the cementitious matrix.

Alternatively, the preparation method according to the invention may comprise the steps of:

a) preparing a hydrogen getter containing at least one metal oxide and advantageously, a metal oxide as defined earlier;

b) incorporating the hydrogen getter prepared in step (a) into a cementitious mixture.

In this case, if one skilled in the art has to apply step (a) of the method, i.e. if the hydrogen getter based on at least one metal oxide has to be prepared, one skilled in the art will be able to easily carry out this preparation.

Thus, when the metal oxide applied is a mixture of manganese oxide ($MnO_2$) and silver oxide ($Ag_2O$), step (a) of the method consists of mixing $MnO_2$, advantageously in the form of activated $MnO_2$, and $Ag_2O$ and this with stirring. As examples, mention may be made of simple stirring with ultrasound, manual stirring, mechanical stirring by means of mechanical stirrers with rods, blades, propellers, etc. . . . , or a combination of these stirring techniques. The thereby obtained mixture is added to water and this in order to facilitate dispersion of the powders. Advantageously, the amount of water used is comprised between 20 and 60%, notably between 30 and 50% and, in particular, of the order of 40% by weight based on the mixture of metal oxide. By « of the order of 40%» , is meant 40%±5%. The whole is then dried in the oven for a period between 15 min and 6 h, notably between 30 min and 4 hrs and, in particular, of the order of 2 hrs. By « of the order of 2 hrs» , is meant 2 hrs±30 min.

Before being incorporated into the cementitious mixture during step (b) of the method according to the invention, the hydrogen getter advantageously appears as a powder mainly consisting of metal oxide and/or agglomerates.

The cementitious mixture applied in step (b) of the method is as defined earlier. Thus, this cementitious mixture comprises one or more elements selected from the group formed by:

i) water,
ii) a clinker and notably a clinker as defined earlier,
iii) a source of sulfate and notably a source of sulfate as defined earlier,
iv) a saline solution of high pH and notably a saline solution of high pH as defined earlier,
v) a solid source containing amorphous aluminosilicates and notably a solid source containing amorphous aluminosilicates as defined earlier, and
vi) silicate components and notably silicate components as defined earlier.

The mixtures of at least two elements selected from (i), (ii) and (iii) are advantageously selected in the case of a hydraulic cementitious matrix, while for a geopolymeric cementitious matrix, the cementitious mixture will comprise at least two elements selected from (iv), (v) and (vi).

The elements which make up the cementitious mixture may be mixed together either beforehand, or simultaneously with the incorporation of the hydrogen getter. During the incorporation of the hydrogen getter into the cementitious mixture, this step may be performed with stirring. The embodiments for applying stirring contemplated earlier also apply to stirring during step (b) of the method according to the invention.

Following step (b) of the method according to the invention, the cementitious mixture into which the hydrogen getter is incorporated, is subject to conditions allowing hardening of the cementitious matrix (step c)). Any technique known to one skilled in the art for hardening a hydraulic cementitious mixture or a geopolymeric cementitious mixture may be used during step (c) of the method.

This hardening advantageously comprises a curing step and/or a drying step. When step (c) comprises a curing step, the latter may be accomplished by moistening the atmosphere surrounding the cementitious mixture into which the hydrogen getter is incorporated or by applying an impervious coating on said mixture. This curing step may be applied under a temperature comprised between 10 and 60° C., notably between 20 and 50° C. and, in particular, between 30 and 40° C. and may last for a period between 1 and 40 days, notably between 5 and 30 days, and in particular, between 10 and 20 days.

When step (c) comprises a drying step, the latter may be accomplished at a temperature comprised between 30 and 110° C., notably between 40 and 90° C. and, in particular, between 50 and 70° C. and may last for a period between 6 hrs and 10 days, notably between 12 hrs and 5 days and, in particular, between 24 and 60 hrs. Advantageously, step (c) comprises a curing step followed by a drying step, as defined earlier. It should be noted that by drying at a temperature of the order of 105° C. (i.e. 105° C.±5° C.) it is possible to handle the residual water in the cementitious matrix and to thereby avoid the phenomenon of radiolysis.

When step (c) of the method according to the invention comprises a curing step and a drying step as defined earlier, the obtained material has optimum porosity through which the gas(es) to be trapped may access the metal oxide(s). Indeed, an optimum diffusive path is obtained by a method having such a curing step and such a drying step.

Further, prior to the hardening of the cementitious mixture into which the hydrogen getter is incorporated, the latter may be placed in molds so as to give it a predetermined shape as a result of this hardening. On the contrary, the shape of the material according to the invention may be obtained after step (c) of the method, notably by subjecting the hardened product to one or more of the following treatments: cutting, milling, crushing, planing . . . .

The present invention also relates to the use of a material according to the invention and as defined earlier, or of a material which may be prepared in accordance with a method according to the invention and as defined earlier for removing an inflammable gas like hydrogen.

In a particular alternative of this use, removal of the flammable gas like hydrogen may be accomplished in situ. Thus, this alternative relates to the use of a material according to the invention and as defined earlier, or of a material which may be prepared in accordance with a method according to the invention and as defined earlier in order to coat at least one piece of technological waste or at least one radioactive material. This technological waste or this radioactive material may produce by radiolysis or by chemical reaction, a flammable gas such as hydrogen. Said flammable gas may then be trapped in situ by the cementitious material according to the invention coating the technological waste or the radioactive material(s). Technological waste and technological materials which may be applied are as defined earlier.

This alternative consists, more particularly, of coating at least one piece of technological waste or at least one radioactive material in the obtained material following step (b) as defined earlier and this prior to step (c) as defined earlier.

The present invention finally relates to a method for removing a flammable gas like hydrogen in a closed enclosure consisting of placing in said enclosure a material according to the invention and as defined earlier. Any closed enclosure contemplated earlier may be used in this method.

Other features and advantages of the present invention will further become apparent to one skilled in the art on reading the examples below given as an illustration and not as a limitation, with reference to the appended FIGURE.

BRIEF DESCRIPTION OF THE DRAWINGS

FIG. 1 shows the change in the trapping capacity of different coated materials based on a hydrogen getter ($MnO_2$/$Ag_2O$) versus time.

DETAILED DISCUSSION OF CERTAIN ILLUSTRATIVE EMBODIMENTS

1. Preparation of Coated Cements with the Hydrogen Getter

The metal oxides for preparing the hydrogen getter are activated $MnO_2$ (Merck, >90%) and $Ag_2O$ (Merck, >99%). Both compounds are mechanically mixed and water is added to the mixture and then the whole is dried in the oven for 2 hours [16].

Cement/hydrogen getter coated materials were prepared from different binders. The three binders used for preparing the coated materials with the hydrogen getter are the following:

Geopolymer (coated material No. 1),
Portland cement CEM I (coated material No. 2),
Sulfo-aluminous (coated material No. 3).

The products used for the geopolymer are metakaolin of Pieri Premix MK (Grade Construction Products), KOH (Prolabo, 98%) and $SiO_2$ (Tixosil, Degussa).

The Portland/getter and sulfo-aluminous/getter coated materials were respectively prepared with cement of the type CEM I 52.5 N (Lafarge Le Teil) and a mixture 80/20 (by weight) of clinker (yeelimite, β C2S) and gypsum.

The compositions of the different coated materials/getter are reported into the Table 1 hereinafter.

TABLE 1

Composition of the different cement/hydrogen getter coated materials

| | Binder Composition | Water/cement | Getter incorporation level (%) |
|---|---|---|---|
| Coated material 1: geopolymer + getter | Metakaolin: 19.4 g<br>SiO$_2$: 5.16 g<br>KOH: 8.03 g | / | 14.7 |
| Coated material 2: Portland CEM 1 + getter | Cement CEM I: 10.14 g | 0.6 | 30 |
| Coated material 3: sulfo-aluminous + getter | Clinker: 7.9 g<br>gypsum: 1.99 g | 0.6 | 27.5 |

After mixing the coating materials, they were left to cure at 32° C. for 14 days and drying at 60° C. for 48 hours was then carried out.

2. Hydrogen Trapping Capacity of the Coated Materials

In order to determine the hydrogen trapping capacity of the coated materials 1, 2 and 3, measurements for tracking pure hydrogen pressure were conducted and hydrogen trapping capacities were thereby able to be determined. The trapping capacities were reduced to the mass of hydrogen getter (FIG. 1).

The trapping capacity of the different coating materials based on a hydrogen getter (MnO$_2$/Ag$_2$O) was tracked versus time and the results are shown in FIG. 1. The theoretical capacity of the MnO$_2$/Ag$_2$O mixture (90/10 by weight) is of 196 cm$^3$/g [17]. Therefore, for the coated materials 1 and 2, the shaping of the hydrogen getter in a cementitious matrix does not affect the reactivity towards hydrogen of the MnO$_2$/Ag$_2$O mixture. At 40 days, the hydrogen trapping capacity is greater than 120 cm$^3$/g and is not yet stabilized. The hydrogen trapping kinetics of the coated material 3 is much slower with a capacity of more than 80 cm$^3$/g at 40 days.

3. Conclusions

The incorporation of hydrogen getters based on metal oxides into a cementitious matrix allows simplified shaping while retaining the reactivity towards hydrogen. The main advantages of the use of cementitious matrices are resistance to radiolysis, the neutralizing nature of acid species and the handling of poison gases of the getter by controlling the porosity of the coated material.

REFERENCES

[1] P. J. Nigrey, Sandia National Laboratories Report SAND2000-0483.
[2] Patent application in the name of COGEMA LOGISTICS and published under number FR 2 874 120 on Feb. 10, 2006.
[3] U.S. Pat. No. 5,837,158 in the name of Sandia Corporation and published on Nov. 17, 1998.
[4] U.S. Pat. No. 6,063,307 published on May 16, 2000.
[5] U.S. Pat. No. 7,001,535 in the name of Sandia Corporation Laboratories and published under number US 2003/0213934 on Nov. 20, 2003.
[6] www.h2getters.com
[7] R. Livingston, J. Duffey, T. Shepodd and P. McConnell, Sandia National Laboratories Report SAND2002-8267.
[8] M. Stone, M. Benson, Idaho National Engineering and Environmental Laboratories Report, INEEL-EXT 2001-00085.
[9] M. Latroche, A. Percheron-Guegan, Ann. Sci. Mat., 2005, 30 (5), pp 471-482.
[10] H. Charcosset, B. Delmon, Ind. Chim. Belg., 38, (1973), pp 481-495.
[11] International application WO 2006/064289 in the name of JOHNSON MATTHEY PLC published on Jun. 22, 2006.
[12] U.S. Pat. No. 6,200,494 in the name of Saes Getters and published on Mar. 13, 2001.
[13] U.S. Pat. No. 5,888,925 in the name of AlliedSignal Inc. and published on Mar. 30, 1999.
[14] U.S. Pat. No. 4,252,666 in the name of Union Carbide Corporation and published on Feb. 24, 1981.
[15] C. Maruejouls, Fusion Engineering and Design, 69, (2003), pp 585-591.
[16] Patent application in the name of CIMENTS FRANCAIS and published under number EP 0 900 771 on Mar. 10, 1999.
[17] V. Chaudron, Thesis, Institut National Polytechnique de Lorraine, April 1998
[18] U.S. Pat. No. 3,939,006 in the name of Union Carbide Corporation and published on Feb. 17, 1976.

The invention claimed is:

1. A geopolymeric cementitious matrix that traps flammable gas comprising:
at least one metal oxide in a cementitious matrix, wherein the metal oxide is selected from the group consisting of manganese oxide, silver oxide, and mixtures thereof.

2. The geopolymeric cementitious matrix according to claim 1, wherein the flammable gas is hydrogen.

3. The geopolymeric cementitious matrix according to claim 1, wherein the metal oxide is a mixture of manganese oxide (MnO$_2$) and silver oxide (Ag$_2$O).

4. A method for preparing the geopolymeric cementitious matrix according to claim 1, the method comprising incorporating a hydrogen accumulator containing at least one metal oxide into a cementitious mixture.

5. The method according to claim 4, wherein the method further comprises:
preparing a hydrogen accumulator containing at least one metal oxide;
incorporating the hydrogen accumulator into a cementitious mixture.

6. The method according to claim 5, wherein the cementitious mixture comprises one or more elements selected from the group consisting of a saline solution for which the pH is greater than 9, a solid source containing amorphous aluminosilicates and silicate components.

7. The method according to claim 5, wherein the cementitious mixture incorporating the hydrogen accumulator is subject to conditions allowing hardening of the cementitious matrix.

8. The method according to claim 7, wherein the conditions allowing hardening of the cementitious matrix comprises curing the cementitious matrix in a temperature between about 10 and about 60° C. for a period between about 1 and 40 about days.

9. The method according to claim 7, wherein the conditions allowing hardening of the cementitious matrix comprise drying the cementitious matrix at a temperature between about 30 and about 110° C. for a period between about 6 hrs and about 10 days.

10. A method of using the geopolymeric cementitious matrix according to claim 1 for removing a flammable gas.

11. A method of using the geopolymeric cementitious matrix according to claim 1 for coating at least one piece of technological waste or at least one radioactive material.

12. A method of using the geopolymeric cementitious matrix according to claim 1 for removing a flammable gas in a closed enclosure.

13. The method according to claim 4 comprising removing the flammable gas.

14. The method according to claim 4 comprising coating at least one piece of technological waste or at least one radioactive material using the geopolymeric cementitious matrix.

15. The method according to claim 4, wherein the metal oxide is selected from the group consisting of manganese oxide, silver oxide, and mixtures thereof.

16. The method according to claim 4, wherein the metal oxide is a mixture of manganese oxide ($MnO_2$) and of silver oxide ($Ag_2O$).

17. The method according to claim 8, wherein the temperature is between about 20 and about 50° C. and the curing comprises curing for a period between about 5 and about 30 days.

18. The method according to claim 8, wherein the temperature is between about 30 and about 40° C. and the curing comprises curing for a period between about 10 and about 20 days.

19. The method according to claim 9, wherein the temperature is between about 40 and about 90° C. and the drying comprises drying for a period between about 12 hours and about 5 days.

20. The method according to claim 9, wherein the temperature is between about 50 and about 70° C. and the drying comprises drying for a period between about 24 hours and about 60 hours.

* * * * *